(12) United States Patent
Jeong et al.

(10) Patent No.: US 8,837,445 B2
(45) Date of Patent: Sep. 16, 2014

(54) OPERATING METHOD FOR A WPAN DEVICE

(75) Inventors: Wun-Cheol Jeong, Daejeon (KR); Chang-Sub Shin, Daejeon (KR); Anseok Lee, Daejeon (KR); Seong-Soon Joo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 25 days.

(21) Appl. No.: 13/319,480

(22) PCT Filed: May 7, 2010

(86) PCT No.: PCT/KR2010/002921
§ 371 (c)(1),
(2), (4) Date: Nov. 8, 2011

(87) PCT Pub. No.: WO2010/128824
PCT Pub. Date: Nov. 11, 2010

(65) Prior Publication Data
US 2012/0069869 A1 Mar. 22, 2012

Related U.S. Application Data

(60) Provisional application No. 61/225,219, filed on Jul. 14, 2009.

(30) Foreign Application Priority Data

May 8, 2009 (KR) .......................... 10-2009-0040467
May 7, 2010 (KR) .......................... 10-2010-0042989

(51) Int. Cl.
*H04W 4/00* (2009.01)
*H04L 12/40* (2006.01)
*H04W 28/18* (2009.01)
*H04W 76/02* (2009.01)
*H04W 84/10* (2009.01)
*H04W 60/00* (2009.01)

(52) U.S. Cl.
CPC ......... *H04L 12/40013* (2013.01); *H04W 76/02* (2013.01); *H04W 28/18* (2013.01); *H04W 84/10* (2013.01); *H04W 60/00* (2013.01)
USPC ....................................................... 370/338

(58) Field of Classification Search
USPC ........... 370/320, 328–350, 441; 375/132–137
See application file for complete search history.

(56) References Cited

U.S. PATENT DOCUMENTS 8,331,311 B2 * 12/2012 Lee et al. ...................... 370/330

FOREIGN PATENT DOCUMENTS

CN 101189834 5/2008
EP 1455461 A1 9/2004
(Continued)

OTHER PUBLICATIONS

Jeong et al, Distributed Channel Hopping (DCH) over EGTS Structure, IEEE, 21 pages, May 2009.*

(Continued)

*Primary Examiner* — Frank Duong
(74) *Attorney, Agent, or Firm* — Nelson Mullins Riley & Scarborough LLP

(57) ABSTRACT

A method of operating a device capable of periodically hopping a predetermined interval using a channel hopping sequence in order to improve low radio frequency (RF) reliability caused by single frequency based channel access.

5 Claims, 15 Drawing Sheets

| NAME | TYPE | VALIDITY RANGE |
|---|---|---|
| ChannelOffset | INTEGER | 0~255 |
| ChannelSequenceRequest | INTEGER | 0~1 |

(56) References Cited

FOREIGN PATENT DOCUMENTS

| KR | 2001-0024100 | 3/2001 |
| KR | 1020050112408 | 11/2005 |
| KR | 1020080092774 | 10/2008 |

OTHER PUBLICATIONS

International Search Report and Written Opinion for Application No. PCT/KR2010/002921, dated Dec. 21, 2010.

IEEE 802.15-09-0215-00-004e, "Channel Diversity Sub group Report," Project: IEEE P802.15 Working Group for Wireless Personal Area Networks (WPANs), 30 pages (2009).

IEEE 802.15-09-0399-00-004e, "Distributed Channel Hopping (CDH) over EGTS Structure," Project: IEEE P802.15 Working Group for Wireless Personal Area Networks (WPANs), 21 pages (2009).

* cited by examiner

FIG. 1

| NAME | TYPE | VALIDITY RANGE |
| --- | --- | --- |
| ChannelOffset | INTEGER | 0~255 |
| ChannelSequenceRequest | INTEGER | 0~1 |

FIG. 2

| NAME | TYPE | VALIDITY RANGE |
| --- | --- | --- |
| ChannelOffset | INTEGER | 0~255 |
| ChannelSequenceRequest | INTEGER | 0~1 |

FIG. 3

| NAME | TYPE | VALIDITY RANGE |
| --- | --- | --- |
| ChannelOffset | INTEGER | 0~255 |
| ChannelHoppingSequenceLength | INTEGER | 0~255 |
| ChannelHoppingSequence | OCTET SET | – |

FIG. 4

| NAME | TYPE | VALIDITY RANGE |
| --- | --- | --- |
| ChannelOffset | INTEGER | 0~255 |
| ChannelHoppingSequenceLength | INTEGER | 0~255 |
| ChannelHoppingSequence | OCTET SET | – |

FIG. 5

| NAME | TYPE | VALIDITY RANGE |
|---|---|---|
| DCHDescriptor | DCHDescriptor VALUE | REFER TO FIG. 6 |

FIG. 6

| NAME | TYPE | VALIDITY RANGE |
|---|---|---|
| DefaultSequenceFlag | INTEGER | 0~1 |
| ChannelHoppingSequenceLength | INTEGER | 0~255 |
| ChannelHoppingSequence | OCTET SET | - |
| ChannelOffset | INTEGER | 0~255 |
| ChannelOffsetBitmapLength | INTEGER | 0~255 |
| ChannelOffsetBitmap | OCTET SET | - |

FIG. 7

| NAME | TYPE | VALIDITY RANGE |
|---|---|---|
| ChannelHoppingSpecification | OCTET SET | - |

FIG. 9

| octets | | |
|---|---|---|
| 2 | FCS | MFR |
| variable | BEACON PAYLOAD | MAC payload |
| variable | BEACON BITMAP | |
| 4 | TIME SYNCHRONIZATION SPECIFICATION | |
| variable | CHANNEL HOPPING SPECIFICATION | |
| 4 | DSME SUPERFRAME SPECIFICATION | |
| variable | FRAME CONTROL | |
| variable | GTS | |
| 2 | SUPERFRAME SPECIFICATION | |
| 0/5/6/10/14 | AUXILIARY SECURITY HEADER | MHR |
| 4/10 | ADDRESSING FIELDS | |
| 1 | SEQUENCE NUMBER | |
| octets: 2 | FRAME CONTROL | |

FIG. 10

| bit: 0~3 | 4 | 5 | 6 | 7~22 | 23~30 | 31 | 32~34 | variable |
|---|---|---|---|---|---|---|---|---|
| MULTI-SUPERFRAME ORDER (MO) | CAP REDUCTION FLAG | EMBEDDED CAP/CFP FLAG | CHANNEL DIVERSITY MODE | CAP INDEX | NUMBER OF SUBSLOTS | GACK FLAG | ECFP START SLOT LENGTH | ECFP START SLOT |

FIG. 11

| octet: 1 | 1 | 1 | variable |
|---|---|---|---|
| DEFAULT SEQUENCE FLAG | CHANNEL OFFSET | CHANNEL LENGTH OFFSET BITMAP LENGTH | CHANNEL OFFSET BITMAP |

FIG. 12

| CONNECTION STATUS | DESCRIPTION |
|---|---|
| 0x00 | CONNECTION SUCCESSFUL |
| 0x01 | PAN at capacity |
| 0x02 | PAN ACCESS DENIED |
| 0x03 | CHANNEL HOPPING SEQUENCE OFFSET DUPLICATION |
| 0x7f | RESERVATION |
| 0x80~0xff | RESERVATION FOR MAC PRIMITIVES ENUMERATION VALUE |

FIG. 13

| octets | 1 | 1 | 1 |
|---|---|---|---|
| MHR fields | COMMAND FRAME IDENTIFIER | CAPABILITY INFORMATION | CHANNEL OFFSET |

FIG. 14

| bit: 0 | 1 | 2 | 3 | 4 | 5 | 6 | 7 |
|---|---|---|---|---|---|---|---|
| ALTERNATIVE PAN COORDINATOR | DEVICE TYPE | POWER SOURCE TYPE | RECEIVER ON WHEN IDLE | CHANNEL SEQUENCE REQUEST | RESERVATION | SECURITY CAPABILITY | ADDRESS ALLOCATION |

FIG. 15

| octets | 1 | 2 | 1 | 1 | 1 |
|---|---|---|---|---|---|
| MHR fields | COMMAND FRAME IDENTIFIER | SHORT ADDRESS | CONNECTION STATUS | CHANNEL HOPPING SEQUENCE LENGTH | CHANNEL HOPPING SEQUENCE |

FIG. 16

| octets | 1 | variable |
|---|---|---|
| MHR fields | COMMAND FRAME IDENTIFIER | DSME CHARACTERISTICS |

FIG. 17

| bit: 0 | 1~8 | 9 | 10~12 | 13~14 | 15 | 16~55 | variable |
|---|---|---|---|---|---|---|---|
| CHANNEL DIVERSITY MODE | DSME LENGTH | DSME DIRECTION | DSME CHARACTERISTICS TYPE | DSME HANDSHAKE TYPE | PRIORITIZED CHANNEL ACCESS | DSME DESCRIPTOR | DSME ABT SPECIFICATION |

FIG. 19A
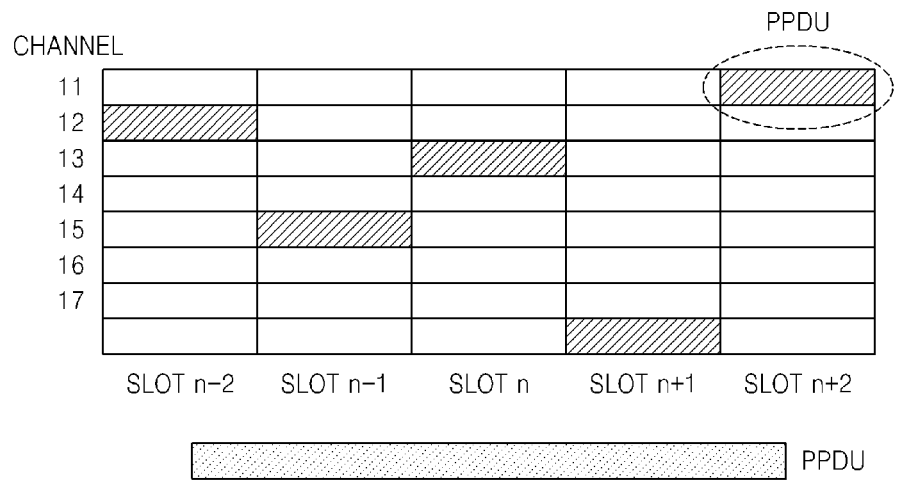
FIG. 19B
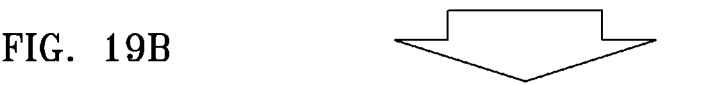
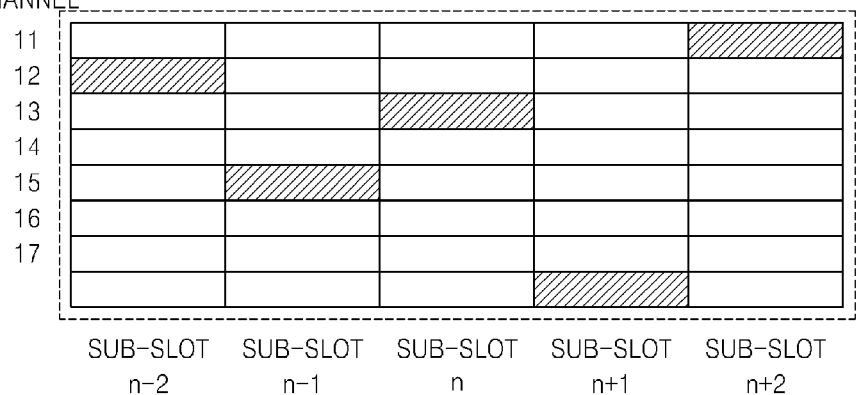

FIG. 20

| PHY HOPPING SEQUENCE | LOGICAL CHANNEL NUMBERS |
|---|---|
| {1,3,5,7} | 1 |
| {2,4,6,8} | 2 |
| {9,11,13,15} | 3 |
| {10,12,14,16} | 4 |

FIG. 21

| MAC HOPPING SEQUENCE | PHY CHANNEL HOPPING SEQUENCE |
|---|---|
| {1,2,3,4} | {{1,3,5,7},{2,4,6,8},{9,11,13,15}, {10,12,14,16}} |
| {2,3,4,1} | {{2,4,6,8},{9,11,13,15}, {10,12,14,16},{1,3,5,7}} |
| {3,4,1,2}, | {{9,11,13,15},{10,12,14,16},{1,3,5,7}, {2,4,6,8}} |
| {4,1,2,3}, | {{10,12,14,16},{1,3,5,7}, {2,4,6,8},{9,11,13,15}} |

FIG. 22

| ATTRIBUTES | IDENTIFIER | TYPE | VALIDITY RANGE |
|---|---|---|---|
| macChannelDiversityMode | 0x62 | INTEGER | 0~1 |
| macChannelHoppingSequence | 0x69 | BITMAP | – |
| macChannelOffset | 0x6a | INTEGER | 0x00~0xFF |

FIG. 23
CHANNEL HOPPING SEQUENCE  $C=\{C_1, C_2, C_3, \ldots, C_N\}$
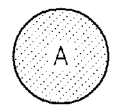
SEQUENCE OF CHANNEL OFFSET VALUE 1
: $C_A=\{C_2, C_3, C_4, \ldots, C_N, C_1\}$
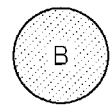
SEQUENCE OF CHANNEL OFFSET VALUE 3
: $C_B=\{C_4, C_5, C_6, \ldots, C_2, C_3\}$

OPERATING METHOD FOR A WPAN DEVICE

RELATED APPLICATIONS

This application is a 35 U.S.C. §371 filing of International Application Number PCT/KR2010/002921 which was filed on May 7, 2010, and which claims priority to, and the benefit of, U.S. Provisional Application No. 61/225,219, filed on Jul. 14, 2009, Korean Application Nos. 10-2009-0040467, filed on May 8, 2009; 10-2010-0042989, filed on May 7, 2010. The contents of the aforementioned applications are hereby incorporated herein by reference.

TECHNICAL FIELD

The present invention relates to a wireless personal area network (WPAN), and more particularly, to a method of operating a device in a wireless multi-hop environment.

BACKGROUND ART

The IEEE 802.15.4 media access control (MAC) system is the most representative technology for realizing a real-time high reliability service in a low power based wireless sensor network (WSN) system. The IEEE 802.15.4 MAC system constitutes a network having a tree structure starting from a personal area network is coordinator (PNC), allocates an independent active duration to each node according to a scheduling method, and supports communication during the corresponding active duration.

When each node transmits a beacon, the active duration is referred to as an outgoing superframe duration (OSD). When a parent node transmits a beacon in the tree structure, the active duration is referred to as an incoming superframe duration (ISD). OSDs of adjacent nodes are scheduled not to overlap temporally in order to avoid beacon collisions.

A node basically receives data using carrier sense multiple access with collision avoidance (CSMA-CA) during a contention access period (CAP) in order to communicate with a parent node. When a node desires channel access in a beacon based operating mode, a child node may use scheduling based channel access during a designated time slot. In more detail, nodes capable of performing one-hop communication with the PNC receive guaranteed time slots (GTS) and perform scheduling data communication. To this end, nodes capable of directly communicating with the PNC indicate that they require independent time by sending a GTS request frame, and the PNC transmits whether to allocate time by using a beacon.

However, since the IEEE 802.15.4 MAC system uses a single frequency in a duration of using a link, it is vulnerable to an interference signal having the same radio frequency (RF) band, and difficult to variably schedule a communication link bandwidth. Furthermore, since the IEEE 802.15.4 MAC system uses a tree topology, it is possible to communicate between a parent node and a child node but impossible to communicate between child nodes.

DETAILED DESCRIPTION OF THE INVENTION

Technical Problem

The present invention provides a method of operating a device capable of periodically hopping a predetermined interval using a channel hopping sequence in order to improve a low radio frequency (RF) reliability caused by single frequency based channel access.

Technical Solution

According to an aspect of the present invention, there is provided a method of operating a wireless personal area network (WPAN) device, the method including: generating an association request primitive used to allow the WPAN device to request an association to a coordinator, wherein the association request primitive includes: a first parameter indicating an offset value of a channel hopping sequence; and a second parameter indicating a usage of a default channel hopping sequence.

According to another aspect of the present invention, there is provided a method of operating a WPAN device, the method including: generating an association indication primitive used to indicate a receipt of an association request command, wherein the association indication primitive includes: a first parameter indicating an offset value of a channel hopping sequence; and a second parameter indicating a usage of a default channel hopping sequence.

According to another aspect of the present invention, there is provided a method of operating a WPAN device, the method including: generating an association response primitive used to initiate a response to an association indication primitive, wherein the association response primitive includes: a first parameter indicating an offset value of a channel hopping sequence; a second parameter indicating a length of the channel hopping sequence; and a third parameter indicating a sequence of logical channel numbers set by a next higher layer (NHL).

According to another aspect of the present invention, there is provided a method of operating a WPAN device, the method including: generating an association confirm primitive used to notify an NHL of an initiation device whether an association request is successful, wherein the association confirm primitive includes: a first parameter indicating an offset value of a channel hopping sequence; a second parameter indicating a length of the channel hopping sequence; and a third parameter indicating a sequence of logical channel numbers set by an NHL.

According to another aspect of the present invention, there is provided a method of operating a WPAN device, the method including: generating an indication primitive defining a method of notifying the WPAN device of a time when a beacon is received under normal operating conditions, wherein the indication primitive includes: a parameter including a description of a channel hopping specification.

According to another aspect of the present invention, there is provided a method of operating a WPAN device, the method including: receiving a request primitive used to allow transmission of a slot allocation request to a PAN coordinator or a destination device; and applying channel diversity including a channel adaptation mode and a channel hopping mode to a slot allocation according to flag information included in the request primitive.

According to another aspect of the present invention, there is provided a method of operating a WPAN device, the method including: generating a start request primitive including a descriptor regarding a received beacon, wherein the descriptor includes: a first element indicating a usage of a default channel hopping sequence; a second element indicating a length of a channel hopping sequence; a third element indicating a sequence of logical channel numbers set by an NHL; a fourth element indicating an offset value of the channel hopping sequence; a fifth element indicating a length of a channel offset bitmap indicating whether a corresponding channel offset is used; and a sixth element including the channel offset bitmap.

According to another aspect of the present invention, there is provided a method of operating a WPAN device, the method including: generating a beacon frame, wherein the beacon frame includes a field indicating a mode in which a distributed synchronous multi-channel extension (DSME) operates in a channel diversity mode including a channel adaptation mode or a channel hopping mode.

According to another aspect of the present invention, there is provided a method of operating a WPAN device, the method including: generating an association response command frame to an association request command, wherein the association response command frame includes an association status field including a channel hopping sequence offset duplicate.

According to another aspect of the present invention, there is provided a method of operating a WPAN device, the method including: generating an association request command frame, wherein the association request command frame includes a channel offset field including an offset value of an unassociated device that wishes an association to a PAN.

According to another aspect of the present invention, there is provided a method of operating a WPAN device, the method including: generating an association response command frame, wherein the association response command frame includes: if a PAN operates in a beacon enabled mode and a channel hopping mode, a channel hopping is sequence length field indicating a length of a channel hoping sequence used in the PAN; and a channel hopping sequence field indicating the channel hoping sequence used in the PAN.

According to another aspect of the present invention, there is provided a method of operating a WPAN device, the method including: generating a handshake command frame including a DSME characteristics field, wherein the DSME characteristics field includes a channel diversity mode subfield indicating a channel adaptation mode or a channel hopping mode.

According to another aspect of the present invention, there is provided a method of operating a WPAN device, the method including: selecting a channel offset value different from channel offset values of other devices within an interference range in order to prevent the same channel from being used by other devices; and repeating a channel hopping sequence reflecting a channel offset in all slots of a multi-superframe including a plurality of superframes.

According to another aspect of the present invention, there is provided a method of operating a WPAN device, the method including: receiving a beacon frame; renewing a value of a channel diversity specification field of a PAN descriptor to a value of a channel diversity specification field of the beacon frame; transmitting the value of the channel diversity specification field to an NHL through a confirm primitive; and renewing a channel offset bitmap of a MAC PAN information base (FIB) to value of the channel diversity specification field of the beacon frame.

According to another aspect of the present invention, there is provided a method of operating a WPAN device, the method including: if a PAN uses a DSME and a channel hopping mode, renewing a value of a DCHDescriptor parameter in a request primitive, wherein the renewing is performed in a MAC sublayer.

According to another aspect of the present invention, there is provided a method of operating a WPAN device, the method including: if a DSME and a channel hopping mode are used in a PAN, setting a channel diversity specification field of a beacon frame, wherein the setting is performed by a MAC sublayer; and setting MAC PIB attributes as values of a channel offset bitmap field indicating a channel offset available in 1-hop neighboring devices.

According to another aspect of the present invention, there is provided a method of operating a WPAN device, the method including: mapping channel hopping is sequences to logical channel numbers for physical layer (PHY) frequency hopping (FH); and using a channel hopping sequence corresponding to a logical channel number of a MAC hopping sequence in the PHY-FH.

Effect of the Invention

According to the present invention, a channel hopping sequence is used to periodically perform hopping, which results in a channel diversity gain, thereby improving reliability of communication.

Furthermore, devices share the channel hopping sequence, so that a mesh structure is supported other than a tree structure, and thus devices select an optimal relay device based on a channel status and system resources, thereby minimizing a delay time. A higher layer is able to select multiple relay paths according to the mesh structure, which results in the channel diversity gain.

Three-way handshaking is used to solve a network extensibility problem due to a monopoly of the channel hopping sequence of devices. A dispersion type time slot allocation method is able to solve a device lifetime reduction problem due to a complexity and calculation power consumption of a specific device caused by centralized scheduling, and to improve network stability by removing dependency of a specific node with respect to determination of forming a link.

Offset management makes it possible to form a star-topology, and thus devices that use the IEEE 802.15.4 MAC system are compatible with each other in a network.

DESCRIPTION OF THE DRAWINGS

The above and other features and advantages of the present invention will become more apparent by describing in detail exemplary embodiments thereof with reference to the attached drawings in which:

FIG. 1 is a table of some parameters of a media access control (MAC) sublayer management entity (MLME)-ASSOCIATE request primitive, according to an embodiment of the present invention;

FIG. 2 is a table of some parameters of a MLME-ASSOCIATE indication primitive, according to an embodiment of the present invention;

FIG. 3 is a table of some parameters of a MLME-ASSOCIATE response primitive, according to an embodiment of the present invention;

FIG. 4 is a table of some parameters of a MLME-ASSOCIATE confirm primitive, according to an embodiment of the present invention;

FIG. 5 is a table of some parameters of a MLME-distributed synchronous multi-channel extension (DSME)-START request primitive, according to an embodiment of the present invention;

FIG. 6 is a table of a DCHDescriptor parameter of the MLME-DSME-START request primitive, according to an embodiment of the present invention;

FIG. 7 is a table of some parameters of a MLME-DSME-BEACON-NOTIFY indication primitive, according to an embodiment of the present invention;

FIG. 9 is a format of a beacon frame, according to an embodiment of the present invention;

FIG. 10 is a detailed format of a DSME superframe specification field included in the beacon frame of FIG. 9;

FIG. 11 is a detailed format of a channel hopping specification field included in the beacon frame of FIG. 9;

FIG. 12 is a table of an association status field of an association response command frame, according to an embodiment of the present invention;

FIG. 13 is a format of a DSME-association request command frame, according to an embodiment of the present invention;

FIG. 14 is a detailed format of a capacity information field of the DSME-association request command frame of FIG. 13;

FIG. 15 is a format of a DSME-association response command frame, according to an embodiment of the present invention;

FIG. 16 is a format of a DSME handshake command frame, according to an embodiment of the present invention;

FIG. 17 is a detailed format of a DSME feature field of the DSME handshake command frame of FIG. 16;

FIGS. 19A and 19B are diagrams for explaining a channel hopping method performed in a physical layer, according to an embodiment of the present invention;

FIG. 20 is a table of logical channel numbering, according to an embodiment of the present invention;

FIG. 21 is a table of physical layer (PHY) channel hopping sequences using the logical channel numbering of FIG. 20;

FIG. 22 is a table of some MAC personal area network (PAN) information based (FIB) attributes, according to an embodiment of the present invention;

FIG. 23 is a diagram illustrating reuse of a single hopping sequence using offset values, according to an embodiment of the present invention;

BEST MODE

Figure 8:
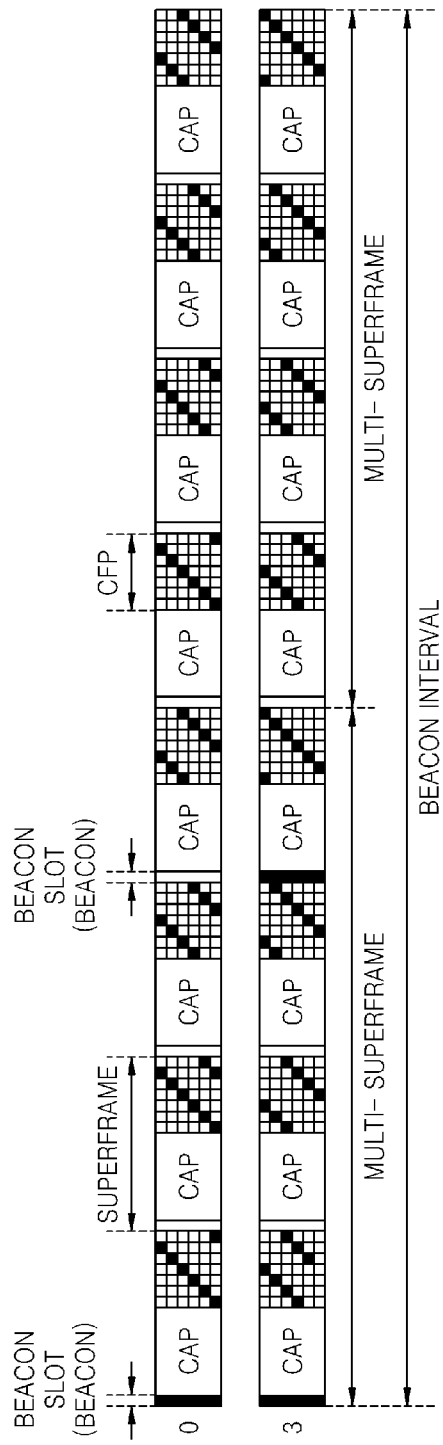
FIG. 8 is a format of a multi-superframe, according to an embodiment of the present invention.

Hereinafter, the present invention will be described in detail by explaining exemplary embodiments of the invention with reference to the attached drawings.

The present invention uses a channel adaptation method and a channel hopping method as channel diversity methods. The channel adaptation method does not change a channel currently being used unless quality of a received signal falls below an established threshold value, whereas the channel hopping method switches channels every time slot according to a previously defined channel hopping pattern. A channel hopping pattern, i.e., a channel hopping sequence, is established by a next higher layer (NHL).

Personal area network (PAN) operation modes include a beacon enabled mode and a non-beacon enabled mode. The channel adaptation method and the channel hopping method are realized on a distributed synchronous multi-channel extension (DSME) structure, i.e., enhanced guaranteed time slot (EGTS) in the beacon enabled is mode.

Primitives are defined as a service between a service user and a service provider and include four types that are a request, an indication, a response, and a confirmation. The primitives relating to an operation of a device, according to the present invention, will be described, and each primitive may include various conventional parameters that are not described in the present invention. The device may generate and use each primitive for the purpose thereof.

FIG. 1 is a table of some parameters of a media access control (MAC) sublayer management entity (MLME)-ASSOCIATE request primitive, according to an embodiment of the present invention. Referring to FIG. 1, the MLME-ASSOCIATE request primitive allows a device to request an association with a coordinator and is used to transfer an association request to an NHL of the device to a MAC layer. The MLME-ASSOCIATE request primitive includes a ChannelOffset parameter, a ChannelSequenceRequest parameter, etc.

The ChannelOffset parameter indicates an offset value of a channel hopping sequence desired by the device.

The ChannelSequenceRequest parameter indicates a usage of a default channel hopping sequence. If the ChannelSequenceRequest parameter is '1', the ChannelSequenceRequest parameter requests a coordinator thereof for the channel hopping sequence.

FIG. 2 is a table of some parameters of a MLME-ASSOCIATE indication primitive, according to an embodiment of the present invention. Referring to FIG. 2, the MLME-ASSOCIATE indication primitive is used to indicate a receipt of an association request command to an NHL. The MLME-ASSOCIATE indication primitive includes a ChannelOffset parameter, a ChannelSequenceRequest parameter, etc.

The ChannelOffset parameter and the ChannelSequenceRequest parameter are the same as described with reference to FIG. 1 and thus descriptions thereof will not be repeated here.

FIG. 3 is a table of some parameters of a MLME-ASSOCIATE response primitive, according to an embodiment of the present invention. Referring to FIG. 3, the MLME-ASSOCIATE response primitive is used to initiate a response to a MLME-ASSOCIATE indication primitive. The MLME-ASSOCIATE response primitive is includes a ChannelOffset parameter, a ChannelHoppingSequenceLength parameter, a ChannelHoppingSequence parameter, etc.

The ChannelOffset parameter indicates an offset value of a channel hopping sequence.

The ChannelHoppingSequenceLength parameter indicates a length of the channel hopping sequence.

The ChannelHoppingSequence parameter indicates a sequence of logic channel numbers set by a NHL. If the ChannelSequenceRequest parameter is 1 in an association request made by an initiating device, a value of the ChannelHoppingSequence parameter is set. A PAN coordinator selects a sequence that is to be used when establishing a PAN.

FIG. 4 is a table of some parameters of a MLME-ASSOCIATE confirm primitive, according to an embodiment of the present invention. Referring to FIG. 4, the MLME-ASSOCIATE confirm primitive is used to inform the NHL of the initiating device whether an association request is successful.

The MLME-ASSOCIATE confirm primitive includes a ChannelOffset parameter, a ChannelHoppingSequence- Length parameter, a ChannelHoppingSequence parameter, etc. The ChannelOffset parameter, the ChannelHoppingSequenceLength parameter, and the ChannelHoppingSequence parameter are the same as described with reference to FIG. 3 and thus descriptions thereof will not be repeated here.

Two modes of channel diversity allocate DSME slots via a DSME handshake command. Channel hopping uses a DSME time slot allocation bitmap (TAB) to exchange channels and DSME slot usage between devices.

Figure 24:
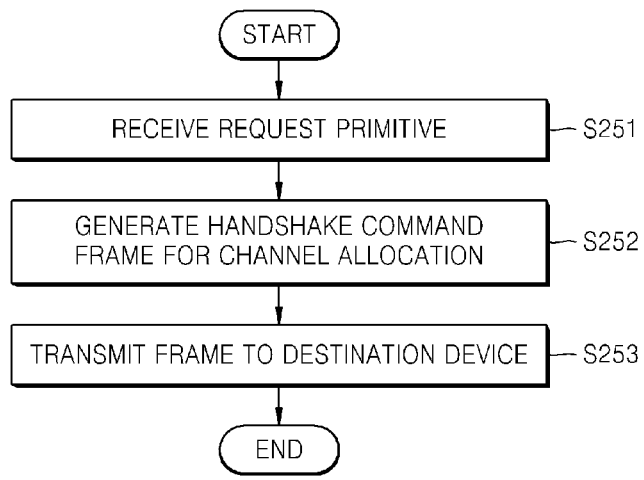
FIG. 24 is a flowchart of an operation of receiving an MLME-DSME request primitive in a device, according to an embodiment of the present invention.

An operation of a device when receiving the MLME-DSME-GTS request primitive will now be described in more detail with reference to FIG. 24. If an MLME of a source device receives the MLME-DSME-GTS request primitive (operation S251), the MLME generates a DSME handshake command frame for performing DSME allocation (operation S252). At this time, a characteristics type subfield of a DSME characteristics field of the DSME handshake command frame is set as '1' (i.e. DSME allocation), and a DSME handshake type subfield is set as '1' (i.e. DSME request). The MLME of the source device transmits the DSME handshake command frame to a destination device.

FIG. 5 is a table of some parameters of a MLME-DSME-START request primitive, according to an embodiment of the present invention. FIG. 6 is a table of a DCH Descriptor parameter of the MLME-DSME-START request primitive, according to an embodiment of the present invention.

The MLME-DSME-START request primitive is used to constitute a new PAN using a PAN coordinator or to designate an established value necessary for a MAC operation after a device accesses a new network.

Referring to FIG. 6, the DCH Descriptor parameter includes a DefaultSequenceFlag element, a ChannelHoppingSequenceLength element, a ChannelHoppingSequence element, a ChannelOffset element, a ChannelOffsetBitmapLength element, a ChannelOffsetBitmap element, etc.

The DefaultSequenceFlag element indicates a usage of a default channel hopping sequence. If the DefaultSequenceFlag element has a value '1', the default channel hopping sequence is used, and the device does not request a channel hopping sequence when associated to a PAN.

The ChannelHoppingSequenceLength element indicates a length of the channel hopping sequence. The ChannelHoppingSequence element indicates a sequence of logic channel numbers established by a NHL. A PAN coordinator selects a sequence that is to be used when establishing a PAN.

The ChannelOffset element indicates an offset value of the ChannelHoppingSequence element.

The ChannelOffsetBitmapLength element indicates a length of the ChannelOffsetBitmap element.

A bit value of a ChannelOffsetBitmap sequence indicates whether a corresponding channel offset is currently being used. If the corresponding channel offset is currently being used, the bit value is set as '1', and if not, the bit value is set as '0'. For example, if a value of the ChannelOffsetBitmapLength element is 16, and $1^{st}$, $2^{nd}$, and $4^{th}$ channel offsets are currently being used, a sequence of the ChannelOffsetBitmap element is '0110100000000000'.

FIG. 7 is a table of some parameters of a MLME-DSME-BEACON-NOTIFY indication primitive, according to an embodiment of the present invention. Referring to FIG. 7, the MLME-DSME-BEACON-NOTIFY indication primitive defines a method of notifying a device of the time when a beacon is received under normal operating is conditions. The MLME-DSME-BEACON-NOTIFY indication primitive includes a ChannelHoppingSpecification parameter.

The ChannelHoppingSpecification parameter indicates a channel hopping specification.

FIG. 8 is a format of a multi-superframe, according to an embodiment of the present invention. Referring to FIG. 8, the multi-superframe includes a plurality of superframes each including a beacon period, a contention access period (CAP), and a contention free period (CFP).

The beacon frames are transmitted during the beacon period. Devices that receive beacons listen to time information for time synchronization, information used to constitute and maintain a network, frequency resource information such as a channel hopping offset value, etc.

The CAP includes a control signal for receiving guaranteed time slots (GTS) or notifying allocated GTS, etc. Although GTS scheduling is preformed during the CAP, data regarding a single urgent message or an inefficient scheduling message is exchanged during the CAP.

GTS are allocated to the CFP. Time slots of the CFP are used to exchange data frames using a channel adaptation method or a channel hopping method. The channel hopping method is performed as shown in FIG. 9 in which channel hopping is performed in time slot units according to a determined hopping sequence. The length of the hopping sequence is generally greater than the number of GTS in a single superframe. If a sequence to be hopped does not end during a GTS period, the sequence is hopped in GTS in a next superframe.

If a channel to be hopped in a specific time slot is a last of the hopping sequence, a channel to be hopped in a next time slot is a first value of the hopping sequence. That is, the channel to be used in the specific time slot is obtained by a cyclic shift of a single hopping sequence.

A plurality of channel hopping sequences may be used in a single network. Each channel hopping sequence may be reused in subnet units having a plurality of devices according to requirements to constitute a network. In this regard, a network including a plurality of devices that share a single hopping sequence is referred to as a subnet. In order to avoid complexity of hopping sequence management, the same hopping sequence is shared in a single subnet. Devices that desire orthogonality of is the hopping sequence reuse the hopping sequence as different offset values in the same hopping sequence.

In a channel hopping mode (i.e. if a channel diversity mode of a beacon frame is '1', refer to FIG. 11), DSME-GST slots use different channels. A series of channels used in each DSME slot is referred to as a channel hopping sequence. The same channel hopping sequence repeats on whole DSME slots in a multi-supreframe. In order to minimize the effect of an interference signal due to the same communication channel, a device may select a channel offset value for preventing the same channel from being used between devices within a range of an RF interference signal. Furthermore, if devices in a PAN having a single channel hopping sequence have different channel hopping offset values, the devices can access different channels in given DSME slots owing to orthogonality between time and frequency.

Figure 25:
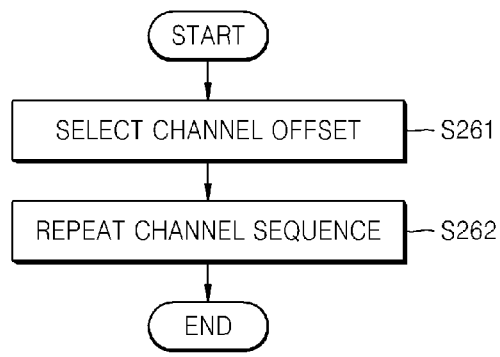
FIG. 25 is a flowchart of a method of operating a channel hopping sequence using a channel hopping offset value, according to an embodiment of the present invention.

In more detail, referring to FIG. 25, which is a flowchart of a method of operating a channel hopping sequence using a channel hopping offset value, according to an embodiment of the present invention, a device of a PAN or a subnet that uses a single channel hopping sequence selects a channel offset value that is different from those of other devices (operation S261). The device repeats a channel hopping sequence on whole DSME-GST slots in a multi-superframe based on the selected channel offset value (operation S262).

An example of scheduling channels and DSME slots in a channel hopping mode will now be described. A channel hopping sequence is {1, 2, 3, 4, 5, 6}, and channel hopping offset values of two devices are 0 and 2, respectively. DSME slots (time slot, channel) for the device having the channel hopping offset value '0' are (1,1), (2,2), (3,3), (4,4), (5,5), (6,6), (7,1), (8,2), and (9,3). Similarly, DSME slots (time slot, channel) for the device having the channel hopping offset value '2' are (1,3), (2,4), (3,5), (4,6), (5,1), and (6,2). Thus, the two devices can be prevented from using the same channel in a single slot.

A channel number C in a given DSME-GST slot index i is determined according to equation 1 below.

$$C(i)=CHSeq([i+CHOffset+BSN] \% CHSeqLength])$$

$$C(i)=CHSeq([(i+CHOffset+BSN) \% CHSeqLength]) \quad \text{[Equation 1]}$$

wherein, CHSeq[j] denotes a $j^{th}$ channel number in a used channel hopping sequence, CHOffset denotes a channel offset value, BSN denotes a beacon sequence number, and CHSeqLength denotes a length of the channel hopping sequence.

The number of whole DSME-GTS slots NoSlot in a multi-superframe is determined according to equation 2 below.

$$NoSlot=(7*2^{(MO-SO)})Slots, \text{ if the value of CAP reduction field is '0'}$$

$$NoSlot=(15*2^{(MO-SO)})Slots, \text{ if the value of CAP reduction field is '1'} \quad \text{[Equation 2]}$$

wherein, MO denotes a length of a time period for which a group of superframes regarded as a single multi-superframe is activated, and is included in a beacon frame (FIGS. 9 and 10) that will be described below, and SO denotes a macSuperframeOrder among MAC PAN information based (FIB) attributes, and a length of a superframe.

FIG. 9 is a format of a beacon frame, according to an embodiment of the present invention. Referring to FIG. 9, a beacon frame includes a MAC header (MHR), a MAC payload, and a MAC footer (MFR).

The MAC header includes a frame control field, a sequence number field, addressing fields, an auxiliary security header. The MAC payload includes a superframe specification field, pending address fields, a DSME superframe specification field, a channel hopping specification field, a time synchronization specification field, a beacon bitmap field, a beacon payload field. The MFR includes a frame check sequence (FCS).

The MAC header, the MFR, the superframe specification field, the pending address fields, the time synchronization specification field, and the beacon payload field of the MAC payload are the same as the conventional beacon frame format and thus detailed descriptions thereof will not be repeated here. Newly added or changed fields according to the present invention will be described.

FIG. 10 is a detailed format of the DSME superframe specification field included in the beacon frame of FIG. 9. Referring to FIG. 10, the DSME superframe specification field includes a multi-superframe order (MO) subfield, a CAP reduction flag is subfield, an embedded CAP/CFP flag subfield, a channel diversity mode subfield, a CAP index subfield, a subslot number subfield, a Group ACK (GACK) flag subfield, an Extended CFP (ECFP) start slot length subfield, and an ECFP start slot subfield.

The MO field indicates a length of a time period for which a group of superframes regarded as a single multi-superframe is activated.

The CAP reduction flag subfield is set as '1' if a CAP reduction is possible and as '0' if the CAP reduction is impossible. The embedded CAP/CFP flag subfield is set as '0' if an embedded CAP is used. The CAP index subfield indicates the number of superframes before a next CAP starts.

The subslot number subfield indicates the number of subslots divided in a slot.

The channel diversity mode subfield indicates a type of channel diversity. If the channel diversity mode subfield has a value '0', the DSME operates in a channel adaptation mode. If the channel diversity mode subfield has a value '1', the DSME operates in a channel hopping mode. If the channel diversity mode subfield has the value '0', the channel hopping specification field of the beacon frame shown in FIG. 10 has no value.

The GACK flag subfield indicates whether a transmission device uses a DSME multi-frame structure. The ECFP start slot length subfield indicates a length of an ECFP start subfield. The ECFP start slot subfield indicates a GACK frame transmission timeslot number.

FIG. 11 is a detailed format of the channel hopping specification field included in the beacon frame of FIG. 9. Referring to FIG. 11, the channel hopping specification field may or may not be included in the beacon frame according to a value of the channel diversity mode subfield.

The channel hopping specification field included in the beacon frame includes a default sequence flag subfield, a channel offset subfield, a channel offset bitmap length subfield, and a channel offset bitmap subfield.

If the channel diversity mode subfield of the DSME superframe specification field of the beacon frame has a value '1', the channel hopping specification field of FIG. 11 is included in the beacon frame.

The default sequence flag subfield indicates a usage of a default channel hopping sequence. If the default sequence flag subfield has a value '1', the default is sequence flag subfield notifies that the default channel hopping sequence is used through the beacon frame.

The channel offset subfield describes a channel hopping offset value of a device.

The channel offset bitmap length subfield describes a length of the channel offset bitmap subfield.

The channel offset bitmap subfield indicates occupancies of channel hopping offset values in neighboring devices and is expressed in a bitmap. If a corresponding channel hopping offset value is already occupied by a neighboring device, each bit is set as '1', whereas, if the corresponding channel hopping offset value is not occupied by the neighboring device, each bit is set as '0'.

For example, a channel offset bitmap of '1100100 . . . 0' indicates that channel hopping offset values of 0, 1, and 4 are used by neighboring devices. In this regard, an $i^{th}$ bit in the channel offset bitmap corresponds to a $(i-1)^{th}$ channel offset value. The length of the channel offset bitmap subfield varies, and is defined by a value specified in the channel offset bitmap length subfield.

A value of the ChannelHoppingSpecification field of a PAN Descriptor is updated to the channel diversity specification of a received beacon frame.

The value of the ChannelHoppingSpecification field is transmitted to an NHL through a MLME-SCAN.confirm primitive. The MLME-SCAN.confirm primitive is defined in the IEEE 802.15.4-2006 and thus a detailed description thereof will not be repeated here.

A value of a macChannelOffsetBitmap among MAC PIB attributes is renewed as a value of the channel offset subfield (refer to FIG. 11) of a received beacon. For example, if the channel offset is set as 0x01, the value of the macChannelOffsetBitmap corresponding to a channel is set as '1'. Furthermore, the value of the macChannelOffsetBitmap indicates that the channel offset value is used by 1-hop neighboring devices.

The MAC PIB attributes of a MAC sublayer renew a value of the DCHDescriptor parameter if the PAN uses a DSME and a channel hoping mode (i.e. if the ChannelDiversityMode is '1').

When the DSME and the channel hoping mode (i.e. if the ChannelDiversityMode is '1') are used in the PAN, the MAC sublayer sets the channel diversity specification field of the beacon frame. A value of the macChannelOffsetBitmap among the MAC is PIB attributes is set as the value of the macChannelOffsetBitmap indicating a channel offset used by the 1-hop neighboring devices.

FIG. 12 is a table of an association status field of an association response command frame, according to an embodiment of the present invention. Referring to FIG. 12, the association status field of the association response command frame indicates an association success, a PAN association deny, in particular, a channel hopping sequence offset repeat subfield, and the like. When a channel offset set by a device that requests an association is duplicated with an offset used by j-hop neighboring devices of a coordinator device, the channel hopping sequence offset duplication is used to notify the device that requests the association of such duplication. The device that requests the association is informed that the offset is being used by the 1-hop neighboring devices.

Figure 26:
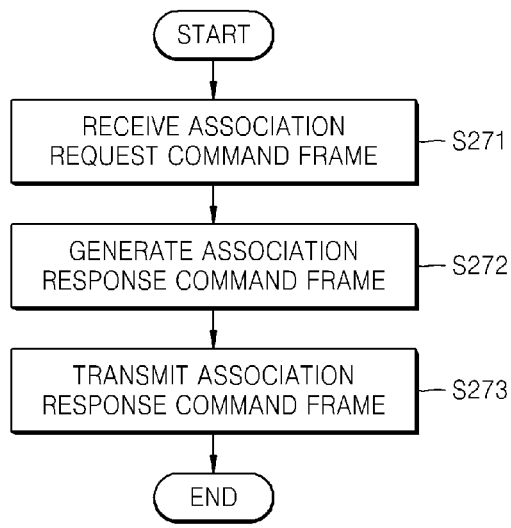
FIG. 26 is a flowchart of an operation of processing association request and response command frames, according to an embodiment of the present invention.

Referring to FIG. 26, when the device receives an association request command frame (operation S271), the device generates the association response command frame including the association status field (operation S272) in response to the association request command frame and transmits the generated association response command frame (operation S273). The association request command frame or the association response command frame is MAC command frames, and in particular, a DSME association request command frame and a DSME association response command frame will be described with reference to FIGS. 13 through 15. If a source device generates the DSME association request command frame of FIG. 13 and transmits it to a destination device, the destination device that receives the DSME association request command frame generates the DSME association response command frame of FIG. 15 and transmits it to the source device.

FIG. 13 is a format of a DSME-association request command frame, according to an embodiment of the present invention. FIG. 14 is a detailed format of a capability information field of the DSME-association request command frame of FIG. 13.

Referring to FIG. 13, the DSME-association request command frame includes MHR fields, a command frame identifier field, the capability information field, and a channel offset field.

The channel offset field is set as an offset value of an unassociated device that desires an association to a PAN. The offset value is specified by a NHL. The capability information field will be described with reference to FIG. 15. The other is subfields are the same as the conventional association request command format and thus descriptions thereof will not be repeated here.

Referring to FIG. 14, the capability information field of the DSME-association request command frame includes an alternative PAN coordinator subfield, a device type subfield, a power source subfield, a receiver on when idle field, a channel sequence request subfield, a reservation subfield, a security capability subfield, and an address allocation subfield.

The channel sequence request subfield has a length of 1 bit, and is set as '1' when the PAN operates in a beacon enabled mode and a channel hopping mode. The other subfields are the same as the conventional association request command format and thus descriptions thereof will not be repeated here.

FIG. 15 is a format of a DSME-association response command frame, according to an embodiment of the present invention. Referring to FIG. 15, the DSME-association response command frame includes MHR fields, a command frame identifier field, a short address field, an association status field, a channel hopping sequence length field, and a channel hopping sequence field.

The channel hopping sequence length field indicates a length of a channel hopping sequence used in a PAN if the PAN operates in a beacon enabled mode and a channel hopping mode. A length of the channel hopping sequence field is defined by the channel hopping sequence length field. The channel hopping sequence field indicates the channel hopping sequence used in the PAN if the PAN operates in the beacon enabled mode and the channel hopping mode. The other subfields are the same as the conventional association response command format and thus descriptions thereof will not be repeated here.

FIG. 16 is a format of a DSME handshake command frame, according to an embodiment of the present invention. FIG. 17 is a detailed format of a DSME characteristics field of the DSME handshake command frame of FIG. 16.

Referring to FIG. 16, the DSME handshake command frame includes an MHR field, a command frame identifier field, and the DSME characteristics field. The MHR field and the command frame identifier field are the same as the conventional DSME handshake command frame format and thus detailed descriptions thereof will not be repeated here.

Referring to FIG. 17, the DSME characteristics field of the DSME handshake is command frame includes a channel diversity mode subfield, a DSME length subfield, a DSME direction subfield, a DSME characteristics type subfield, a DSME handshake type subfield, a prioritized channel access subfield, a DSME descriptor subfield, and a DSME allocation bit table (ABT) specification subfield.

The channel diversity mode subfield has a length of 1 bit and is set as '0' in a channel adaptation mode, and is set as '1' in a channel hopping mode.

The DSME ABT specification subfield includes a DSME ABT sub-block length subfield, a DSME ABT sub-block index subfield, and a DSME ABT sub-block subfield. The DSME ABT sub-block length subfield indicates a length of a unit DSME ABT sub-block. The DSME ABT sub-block index subfield notifies a start of an ABT sub-block in an entire ABT. A DSME ABT sub-block includes a sub-block of an allocation bitmap table.

The other fields are the same as the conventional DSME handshake command frame format and thus detailed descriptions thereof are not repeated here.

Figure 18:
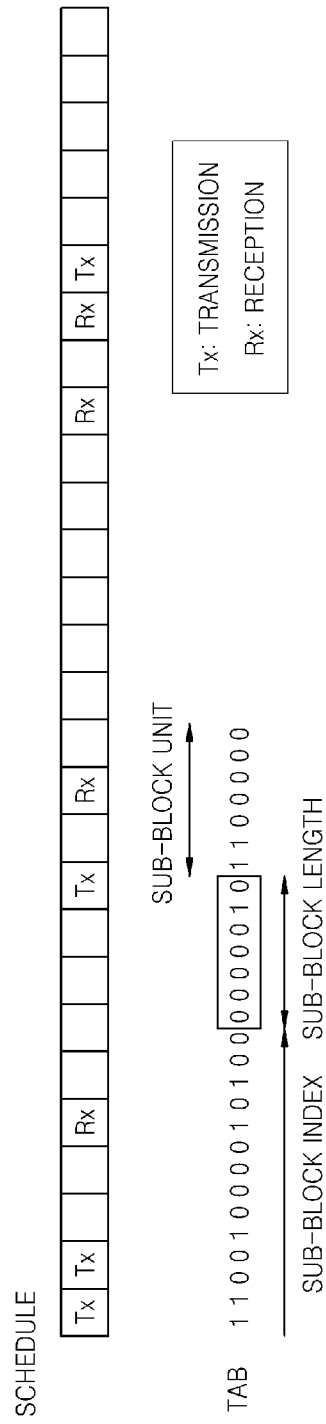
FIG. 18 is a format of a timeslot allocation bitmap (TAB) sub-block, according to an embodiment of the present invention.

FIG. 18 is a format of a timeslot allocation bitmap (TAB) sub-block, according to an embodiment of the present invention. Referring to FIG. 18, when a channel hopping mode is used to obtain a channel diversity gain, i.e. when a channel diversity mode subfield has a value '1', a TAB is used instead of a DSME ABT during a handshaking process in order to allocate timeslots between two devices. A bitmap of the TAB indicates a usage of corresponding DSME slots. If a corresponding slot is allocated for transmission (Tx) or reception (Rx), the bitmap of the TAB is set as '1'. If the corresponding slot is available, the bitmap of the TAB is set as '0'. Similarly to channel adaptation, a DSME ABT sub-block index and a DSME ABT sub-block length indicate a start location and length of the TAB sub-block. Furthermore, sub-blocks of an entire TAB are exchanged for scheduling.

FIGS. 19A and 19B are diagrams for explaining a channel hopping method performed in a physical layer, according to an embodiment of the present invention. Channel diversity methods and the channel hopping method performed in the physical layer may coexist. A fundamental difference between channel hopping methods performed in a MAC and the physical layer (PHY) is whether channels are switched during transmission of a protocol data unit (PPDU). Referring to FIG. 19A, PPDUs are transmitted in different frequency channels in a MAC channel hopping (MAC-CH) structure. Referring to FIG. 19B, PPDUs are separated into segments and the is segments are transmitted in sub-time slots having different frequency channels in a PHY channel hopping structure (PHY-FH).

For example, it is assumed that a MAC-CH channel hopping sequence is {1, 2, 3, 4}. Before transmitting a first PPDU, the PHY sets physical channel information obtained from the channel hopping sequence for the MAC-CH and the PHY-FH. The PHY is unable to determine a channel used to transmit a frame and thus the present invention introduces a logical channel numbering concept.

FIG. 20 is a table of logical channel numbering, according to an embodiment of the present invention. Referring to FIG. 20, the table shows how to map logical channel numbers to channel hopping sequences used for PHY-FH. If the PHY-FH adopts channel hopping sequences {1, 3, 5, 7}, {2, 4, 6, 8}, and {10, 12, 14, 16}, each channel hopping sequence is indicated as logical channel numbers 1 through 4. If a MAC sets the logical channel number 1, the PHY uses the channel hopping sequence {1, 3, 5, 7} to transmit PPDUs.

Figure 27:
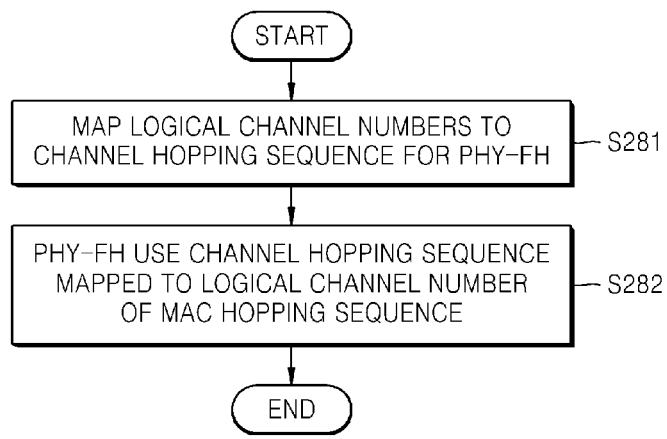
FIG. 27 is a flowchart of a method of operating a PHY channel hopping sequence using logical channel numbering, according to an embodiment of the present invention.

In more detail, referring to FIG. 27, a device maps channel hopping sequences and logical channel numbers for the PHY-FH (operation S281). The PHY-FH uses a channel hopping sequence corresponding to a logical channel number of a MAC hopping sequence (operation S282).

FIG. 21 is a table of PHY channel hopping sequences using the logical channel numbering of FIG. 20. Referring to FIG. 21, if a MAC hopping sequence is {2, 3, 4, 1}, a PHY channel hopping sequence is {2, 4, 6, 8} corresponding to a logical channel number 2, {9, 11, 13, 15} corresponding to a logical channel number 3, {10, 12, 14, 16} corresponding to a logical channel number 4, and {1, 3, 5, 7} corresponding to a logical channel number 1.

FIG. 22 is a table of some MAC PIB attributes, according to an embodiment of the present invention. Referring to FIG. 22, the MAC PIB attributes include macChannelDiversityMode, macChannelHoppingSequence, and macChannelOffset. Although the MAC PIB attributes also include other attributes, the attributes related to the present embodiment are shown in FIG. 22.

The macChannelDiversityMode attribute indicates a type of a channel diversity mode. If the macChannelDiversityMode attribute has a value of 0x00, the channel diversity mode has a type of channel adaptation (default). If the is macChannelDiversityMode attribute has a value of 0x11, the channel diversity mode has a type of channel hopping. These values are invalid with respect to a non-beacon enabled PAN.

The macChannelHoppingSequence attribute indicates a sequence of logical channel numbers. The sequence is set by a NHL.

The macChannelOffset indicates an offset value of a channel hopping sequence. A default value is 0.

FIG. 23 is a diagram illustrating reuse of a single hopping sequence using offset values, according to an embodiment of the present invention. Referring to FIG. 23, nodes A and B share a channel hopping sequence C and use different channel offset values, so that orthogonality therebetween is maintained, thereby avoiding a frequency interference therebetween.

However, nodes of a subnet may use the same offset value, which solves a feasible extensibility problem of a network since the maximum number of allowed nodes is limited to the number of orthogonal code sequences provided by a channel hopping sequence when all nodes have different offset values. For example, if elements of the channel hopping sequence C are not the same ($c_i \neq c_j$) between nodes, the maximum number of nodes capable of operating simultaneously is limited to N. The channel hopping sequence is stored in a MAC FIB, and nodes may have a plurality of sequences.

Offset values of a channel hopping sequence are important information relating to a communication link structure, and are used to renew offset value information between nodes based on information of a beacon frame. A beacon includes a resources allocation field relating to a channel sequence offset and timeslot allocation. A node determines whether to perform a distributed type resources allocation or a centralized type resources allocation using the resources allocation field.

With regard to the distributed type resources allocation, since offset information included in a beacon frame relates to nodes within a 1-hop distance from a node that transmits the beacon frame, nodes that scan the beacon frames and selects offset values sets desired offset values based on offset information of nodes within a 2-hop distance.

With regard to the centralized type resources allocation, a node starts scanning is a beacon similarly to the distributed type resources allocation. A centralized type is notified by the node using a resources allocation field of the beacon, the node does not request an independent hopping sequence offset and requests a communication link during a CAP. That is, if the node transmits the number of necessary timeslots and a node ID to constitute a link, such a request is transferred to a server that manages a centralized type resources allocation process, and the server notifies the node of a channel and timeslot index (i.e. a hopping channel number and a transmission/reception timeslot number).

Communication timeslot allocation processes are divided into a distributed type allocation process and a centralized type allocation process. The centralized type allocation process is described with respect to the offset allocation method, and thus the distributed type allocation process will now be described.

A source device transmits the number of timeslots necessary for a destination device, an available timeslot bitmap, and a channel hopping sequence offset value thereof via a unicast to the destination device. The destination device performs an XOR operation on an available timeslot bitmap thereof and the timeslot bitmap received from the source device, generates timeslot bitmaps to be allocated, selects timeslots requested by the source device, indicates the selected timeslots as a bitmap, and transmits the channel hopping sequence offset value and the bitmap to the source device. The allocated timeslot bitmap is transmitted via a broadcast so that peripheral devices can listen to the transmitted timeslot bitmap.

The source device checks whether the timeslot allocation bitmap received from the destination device is proper, if is the timeslot allocation bitmap is checked to be proper, and retransmits a new timeslot allocation table to the destination device through a notify frame. In this regard, the new timeslot allocation table is transmitted via a broadcast so that periph eral devices can listen to the transmitted timeslot allocation table. Such a three-way handshaking method makes it possible for neighboring nodes that use the same offset to renew timeslot available information and solve a hidden node problem.

If quality of a specific channel that constitutes a hopping sequence continuously deteriorates, the corresponding channel is designated as a block channel and is determined as a sequence element that is unavailable in a channel bitmap. Such block channel information is stored in a PIB and is separately managed, which is is referred to as a black list. Likewise, good quality channels among available channels are referred to as a white list, which is stored in the PIB and is separately managed.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A method of operating a wireless personal area network (WPAN) device, the method comprising:
    generating, using the WPAN device, an association request primitive used to allow the WPAN device to request an association to a coordinator,
    wherein the association request primitive comprises:
    a first parameter indicating an offset value of a channel hopping sequence; and
    a second parameter indicating a usage of a default channel hopping sequence.

2. The method of claim 1, further comprising: if the second parameter has a value '1', requesting a coordinator of the WPAN device for the channel hopping sequence.

3. A method of operating a WPAN device, the method comprising:
    receiving, using the WPAN device, a request primitive used to allow transmission of a slot allocation request to a PAN coordinator or a destination device; and
    applying, using the WPAN device, channel diversity including a channel adaptation mode and a channel hopping mode to a slot allocation according to flag information included in the request primitive.

4. The method of claim 3, wherein the applying of the channel diversity comprises: allocating slots through a handshake command.

5. The method of claim 3, wherein the applying of the channel diversity comprises: exchanging channels and slots usage between devices using a timeslot allocation table (TAB) in the channel hopping mode.

* * * * *